US010124806B2

United States Patent
Raffone

(10) Patent No.: US 10,124,806 B2
(45) Date of Patent: Nov. 13, 2018

(54) AUTOMOTIVE CONTROL UNIT PROGRAMMED TO ESTIMATE ROAD SLOPE AND VEHICLE MASS, VEHICLE WITH SUCH A CONTROL UNIT AND CORRESPONDING PROGRAM PRODUCT

(71) Applicant: C.R.F. Societa' Consortile Per Azioni, Orbassano (IT)

(72) Inventor: Enrico Raffone, Orbassano (IT)

(73) Assignee: C.R.F. Società Consortile per Azioni, Orbassano (IT)

( * ) Notice: Subject to any disclaimer, the term of this patent is extended or adjusted under 35 U.S.C. 154(b) by 216 days.

(21) Appl. No.: 14/901,913

(22) PCT Filed: Jul. 11, 2014

(86) PCT No.: PCT/IB2014/063042
§ 371 (c)(1),
(2) Date: Dec. 29, 2015

(87) PCT Pub. No.: WO2015/004639
PCT Pub. Date: Jan. 15, 2015

(65) Prior Publication Data
US 2016/0332633 A1 Nov. 17, 2016

(30) Foreign Application Priority Data

Jul. 11, 2013 (IT) .............................. TO2013A0584

(51) Int. Cl.
*B60W 40/076* (2012.01)
*G01C 9/08* (2006.01)
(Continued)

(52) U.S. Cl.
CPC ..... *B60W 40/076* (2013.01); *B60G 17/01908* (2013.01); *B60T 8/172* (2013.01);
(Continued)

(58) Field of Classification Search
CPC .................................. B60W 40/076
(Continued)

(56) References Cited

U.S. PATENT DOCUMENTS 5,832,400 A * 11/1998 Takahashi .............. B60K 31/00
701/53
6,167,357 A * 12/2000 Zhu ......................... B60T 8/172
701/102

(Continued)

FOREIGN PATENT DOCUMENTS

DE   10 2005 008 658 A1   8/2006
WO   WO 03/016837 A1   2/2003
(Continued)

OTHER PUBLICATIONS

H.S. Bae et al., "Road Grade and Vehicle Parameter Estimation for Longitudinal Control Using GPS." 2001 IEEE Intelligent Transportation Systems Conference Proceedings—Oakland (CA), USA—Aug. 25-29, 2001, pp. 166-171.
(Continued)

*Primary Examiner* — Moazzam Hossain
(74) *Attorney, Agent, or Firm* — Blank Rome LLP

(57) ABSTRACT

Automotive electronic control unit programmed to realtime estimate either or both of vehicle mass and road slope, wherein; a. road slope, is estimated; a1. when vehicle is considered stopped based on an accelerometer signal indicative of vehicle acceleration, wherein the vehicle is considered stopped in the presence of substantially zero values of a speed signal indicative of vehicle speed, and a2. when vehicle is in rectilinear and curvilinear motion by implementing a road slope observer based on a linear Kalman filter, which is designed to: a21. operate based on signals indicative of vehicle speed and acceleration, and a22. compensate for accelerometric disturbances due to; a221. vehicle static pitch resulting from vehicle load distribution,
(Continued)

and a222. vehicle dynamic pitch due to acceleration to which vehicle is subjected during motion, and a223. accelerometric disturbance components due to vehicle lateral dynamics; b. vehicle mass is estimated: b1. when vehicle is in motion, and b2. based on a recursive least square algorithm with forgetting factor, and b3. based on an accelerometric signal indicative of vehicle acceleration, on a vehicle speed signal, and other signals representing a vehicle propulsive/resistive torque, and b4. at different low gears, to provide a mass estimation and an associated variance for each gear, and b5. based on mass estimations and corresponding variances for each gear, and b6. compensating for accelerometer disturbances due to: b61, vehicle dynamic pitch; and b62. accelerometric disturbance components due to vehicle lateral dynamics; and b7. minimizing uncertainties on propulsive/resistive torque due to gear efficiency and rolling resistance.

14 Claims, 3 Drawing Sheets

(51) Int. Cl.
| | | |
|---|---|---|
| *G01G 19/08* | | (2006.01) |
| *B60W 40/13* | | (2012.01) |
| *B60G 17/019* | | (2006.01) |
| *B60T 8/172* | | (2006.01) |
| *B60T 8/18* | | (2006.01) |
| *F16H 59/52* | | (2006.01) |
| *F16H 59/66* | | (2006.01) |
| *F16H 61/00* | | (2006.01) |
| *B60W 50/00* | | (2006.01) |

(52) U.S. Cl.
CPC .............. *B60W 40/13* (2013.01); *G01C 9/08* (2013.01); *G01G 19/08* (2013.01); *G01G 19/086* (2013.01); *B60G 2400/60* (2013.01); *B60G 2400/61* (2013.01); *B60G 2400/63* (2013.01); *B60T 8/18* (2013.01); *B60T 2250/02* (2013.01); *B60W 2050/0059* (2013.01); *B60W 2510/0657* (2013.01); *B60W 2520/10* (2013.01); *B60W 2520/105* (2013.01); *B60W 2530/10* (2013.01); *B60W 2530/16* (2013.01); *B60W 2550/142* (2013.01); *B60W 2720/106* (2013.01); *F16H 59/52* (2013.01); *F16H 2059/663* (2013.01); *F16H 2061/0078* (2013.01)

(58) Field of Classification Search
USPC .......................................................... 702/154
See application file for complete search history.

(56) References Cited

U.S. PATENT DOCUMENTS

| | | | |
|---|---|---|---|
| 6,438,510 B2 | 8/2002 | Zhu et al. | |
| 7,269,494 B2 | 9/2007 | Corigliano et al. | |
| 7,979,185 B2* | 7/2011 | Wolfgang | G01G 19/086 701/1 |
| 8,311,706 B2* | 11/2012 | Lu | B60T 8/172 340/440 |
| 2001/0001138 A1* | 5/2001 | Zhu | B60T 8/172 702/175 |
| 2003/0040861 A1* | 2/2003 | Bellinger | G01G 19/086 701/51 |
| 2004/0167705 A1* | 8/2004 | Lingman | B60T 8/172 701/124 |
| 2007/0083314 A1* | 4/2007 | Corigliano | B60W 40/072 701/80 |
| 2010/0049400 A1* | 2/2010 | Duraiswamy | B60W 30/143 701/33.4 |
| 2014/0067155 A1* | 3/2014 | Yu | B60W 40/13 701/1 |

FOREIGN PATENT DOCUMENTS

| | | | | |
|---|---|---|---|---|
| WO | WO 03/023334 A1 | 3/2003 | | |
| WO | WO 2006089686 A2 * | 8/2006 | ......... | F16H 61/0213 |

OTHER PUBLICATIONS

P. Lingman et al., "Road Slope and Vehicle Mass Estimation Using Kalman Filtering." Vehicle System Dynamics Supplement, vol. 37, pp. 12-23, 2002.
A. Vahidi et al., "Experiments for Online Estimation of Heavy Vehicle's Mass and Time-Varying Road Grade." Proceedings of IMECE '03, 2003 ASME International Mechanical Engineering Congress, Washington, D.C., Nov. 15-21, 2003, Dynamic Systems and Control Division—2003, DSC—vol. 72-1, pp. 451-458, 2003.

* cited by examiner

AUTOMOTIVE CONTROL UNIT PROGRAMMED TO ESTIMATE ROAD SLOPE AND VEHICLE MASS, VEHICLE WITH SUCH A CONTROL UNIT AND CORRESPONDING PROGRAM PRODUCT

TECHNICAL FIELD OF THE INVENTION

The present invention relates in general to real-time vehicle mass and road slope estimation. In particular, the present invention relates to the application of Kalman filter theory and recursive least squares algorithm with forgetting factor on real time vehicle mass and road grade estimation.

BACKGROUND ART

In a continuous effort to improve control of longitudinal vehicle motion in very different terms it is essential to have to access on-line estimates of parameters as vehicle mass and road slope. Then, vehicle parameters variation plays an even larger role in automated control of vehicles (cars but especially light/heavy commercial vehicles, trucks, tractor & trailers, buses and so on), i.e. light commercial vehicles generally exhibit larger variations in parameters such as vehicle mass (up to 100% differences between loaded and unloaded configurations). Furthermore all main proposed fuel saving evaluation techniques are dependent on the knowledge of how the road ahead will behave, e.g. modest road grades may prove to be quite a challenge for vehicles with low power-to-weight ratio such as commercial vehicles, and how vehicle mass changes real-time and influences $CO_2$ emissions. These facts highlight the need for estimation of road slope and vehicle mass on a motor vehicle, in particular on Light Commercial Vehicle.

In literature, proposed mass and slope estimation approaches are model-based approaches, and this is mainly due to need to scale studied algorithms on different production vehicles with a modular re-design.

A vehicle longitudinal dynamics equation will now be formulated in general form to understand plant non-linearity and/or time variance complexity.

The equation of motion at front wheels when the driveline is fully engaged and all mechanical power from engine is passed to the wheels, has the general form:

$$m_{at} \cdot \ddot{x} = m \cdot g \cdot \sin(\alpha) + F_P - F_R \quad (1)$$

$$m_{at} = m + \frac{J_{wheels}}{R^2} + \frac{\eta \cdot J_{motor}}{R^2 \cdot \tau_t^2 \cdot \tau_d^2}$$

where m is total vehicle mass, $F_p$ is propulsion force and $F_R$ is resistance force, g is gravitational acceleration, $\alpha$ is slope angle, R wheel is radius and $m_{at}$ is equivalent mass at propulsion wheels, so total mass with in addition inertial effects of wheels ($J_{wheels}$) and motor ($J_{motor}$), through gearbox and differential.

In the equation, unknowns are vehicle mass (m) and road slope (sin ($\alpha$)), where vehicle mass, in practice a model parameter, has very slow dynamics while road slope is a 'true' real-time physical quantity with a medium slow dynamics. Seen differential equation (1) is a classic non-linear, time-variant equation. The simultaneous estimation problem requires an Extended Kalman Filter (EKF) design, but the invention's goal is to realize an integrated estimator which is simplest, enough accurate, quite robust and inexpensive under computational complexity and hardware point of view.

The literature presents many algorithms for online estimation of mass and slope.

Historically, there have been proposed estimation algorithms for either mass or slope estimation only; for example, for vehicle mass, algorithms linked to sharp longitudinal accelerations and decelerations which excite vehicle's mass significantly, thereby making this mass easier to estimate.

For example, U.S. Pat. No. 5,482,359 proposes using sharp controlled accelerations and decelerations as part of an event-seeking mass estimation method. Similarly, U.S. Pat. No. 4,548,079 proposes estimating vehicle mass specifically during the sharp accelerations and decelerations introduced by gear shifting. U.S. Pat. No. 4,941,365 proposes a similar mass estimator that explicitly compensates for wheel inertia. Further extensions of the same approach are proposed in U.S. Pat. No. 5,490,063, U.S. Pat. No. 6,167,357, U.S. Pat. No. 6,438,510, U.S. Pat. No. 6,567,734 and US 2007/0038357. In particular, U.S. Pat. No. 6,438,510 discloses estimating vehicle mass and aerodynamic drag coefficient by recursive least squares (RLS), wherein samples of the signals of interest are buffered and their validity is assessed.

On the other hand, there have been proposed algorithms for estimation of the road slope independently from vehicle mass based on longitudinal acceleration model, for example in WO 03/40652, or based on Kalman filtering applied to same longitudinal model, for example in WO 03/016837, and further extensions of same approach for example in U.S. Pat. No. 7,269,494 inferring also vehicle speed sign.

As far as simultaneous estimation of mass and slope, Bae, H. S., Ryu, J., and Gerdes, J. C., 2001, "Road Grade and Vehicle Parameter Estimation for Longitudinal Control Using GPS", Proceedings of the IEEE Intelligent Transportation Systems Conference, for instance, propose a recursive least squares estimator that utilizes longitudinal force, acceleration, and GPS-based road grade measurements to determine vehicle mass and aerodynamic drag.

In WO 03/016837 and in Lingman, A., and Schmidtbauer, B., 2002, "Road Slope and Vehicle Mass Estimation Using Kalman Filtering", Vehicle System Dynamics, 37, pp. 12-23, Lingman and Schmidtbauer investigate the possibility by Kalman filtering to estimate slope and mass using available information on propulsion and brake system characteristics, a vehicle speed measurement and the possible improvement through the addition of a longitudinal accelerometer.

U.S. Pat. No. 6,980,900 proposes again a recursive least squares estimator in which aerodynamic drag forces are simulated online and subtracted from force measurements, rather than estimated.

In Vahidi, A., Druzhinina, M., Stefanopoulou, A., and Peng, H., 2003, "Simultaneous Mass and Time-Varying Grade Estimation for Heavy-Duty Vehicles", Proceedings of the American Control Conference, Denver, Colo., in Vahidi, A., Stefanopoulou, A., and Peng, H., 2003, "Experiments for Online Estimation of Heavy Vehicle's Mass and Time-Varying Road Grade", Proceedings of the 2003 ASME International Mechanical Engineering Congress and Exposition, and in Vahidi, A., Stefanopoulou, A., and Peng, H., 2005, "Recursive Least Squares with Forgetting for Online Estimation of Vehicle Mass and Road Grade: Theory and Experiments", Vehicle System Dynamics, 41(1), pp. 31-55, Vahidi et al. propose a similar estimator that does not require road grade measurements and estimates vehicle mass, drag, and road grade simultaneously using minimal instruments.

The algorithm accommodates the time-varying nature of aerodynamic drag and road grade through multi-rate forgetting.

Winstead, V., and Kolmanovsky, I., 2005, "Estimation of Road Grade and Vehicle Mass via Model Predictive Control", Proceedings of the IEEE Conference on Control Applications, propose an extended Kalman filter that estimates both longitudinal vehicle states and parameters (including mass) for adaptive cruise control.

EP 1935733 proposes a combined estimation in two steps: road slope estimation based on vehicle speed and longitudinal acceleration, and then on this base and drive train signals vehicle mass inference.

DE 10 2005 008658 discloses estimating vehicle mass based on engine torque and on vehicle speed and acceleration. In particular, vehicle mass is estimated based on the comparison of two different computation performed in different ways. Road slope is instead estimated based on the teaching in the above-referenced article of Lingman, A. and Schmidtbauer, B.

Finally, WO 03/023334 A1 discloses simultaneously estimating vehicle mass and road slope either recursively or using an extended Kalman filter or based on an RLS approach.

OBJECT AND SUMMARY OF THE INVENTION

The Applicant has appreciated that there are important practical needs that a real-time estimator should meet to be viable, especially for economy-priced vehicles. In particular, the Applicant has found that it should be:

Simple enough to run in real time despite onboard processing limitations; designed algorithms have to be implemented at the first in post-processing then in real-time environment with low memory allocation and computational complexity;

Accurate enough to estimate desired vehicle state/parameter in defined conditions;

Fast enough to detect changes in a vehicle's states/parameters shortly after it is started and driven onto the road. Estimation needs to be available in according with the activation windows and usability range of estimated information;

Robust enough to operate successfully despite real signals disturbances and model plant uncertainties;

and especially,

Inexpensive enough to penetrate the economy-priced vehicle market. This often translates into a minimal instrumentation requirement and no additional sensors.

With this clear point of view, the Applicant has investigated the possibility of estimating road slope and vehicle mass by using vehicle information on propulsion system state, as motor torque and driveline signal states, together with ESP (Electronic Stability Program) system measures as wheel speed measurements and longitudinal accelerometer available on vehicle CAN network.

The objective of present invention is therefore to provide a real-time estimator that meets the aforementioned requirements.

This objective is achieved by the present invention in that it relates to a real-time vehicle mass and road slope estimator, as defined in the appended claims.

Compared to the solution disclosed in WO 03/016 837, where different estimation approaches are proposed to estimate road slope and vehicle mass in vehicle dynamic conditions, and where a more complete solution is disclosed, which is based on an extended, namely non-linear and time-variant, Kalman filter, which is used to estimate either vehicle mass only or vehicle mass and road slope simultaneously, in the present invention road slope is estimated in vehicle static and dynamic conditions and, in particular, in dynamic conditions, and based on a linear and time-invariant Kalman filter, while vehicle mass is estimated based on a recursive algorithm applied to a linear and time-variant model.

Compared to the solution disclosed U.S. Pat. No. 6,438,510, in the present invention no buffering and validity assessment of samples for subsequent processing is provided, rather data are directly selected and then only those that are believed to be valid for the estimate are considered. In addition, no aerodynamic drag coefficient is considered in the present invention, and the RLS algorithm is applied to engine torque and vehicle acceleration, rather than engine torque and vehicle speed.

Compared to the solution disclosed in DE 10 2005 0086 58, in the present invention vehicle mass is estimated in a completely different way, while road slope is estimated based on the teaching in the above-referenced article of Lingman, A. and Schmidtbauer, B., but it fails to cover all the static and dynamic conditions that are instead covered by the present invention.

In the end, compared to the solution disclosed in WO 03/023 334, where simultaneously vehicle mass and slope estimation using an RLS approach is technically unpracticable due to the difficulty in estimating quantities with so different dynamics, in the present invention the RLS algorithm is used to estimate vehicle mass only, which is estimated based also on road slope, while a linear and time-invariant kalman filter is used to estimate road slope.

DETAILED DESCRIPTION OF PREFERRED EMBODIMENTS OF THE INVENTION

The following description is provided to enable a person skilled in the art to make and use the invention. Various modifications to the embodiments will be readily apparent to those skilled in the art, without departing from the scope of the present invention as claimed. Thus, the present invention is not intended to be limited to the embodiments shown, but is to be accorded the widest scope consistent with the principles and features disclosed herein and defined in the appended claims.

In coherence with explained simplicity and sustainability of estimations, it has been found that the possibility to obtain the estimations with a single extended states estimator, with its relative problems about convergence, different represented dynamics and non-linearity, is to be put aside.

Instead, it has been found suitable to simplify and reduce to the most basic form the problem with a top-down approach. In practice, road slope and vehicle mass are estimates separately by using different model references and real vehicle measurements, in order to obtain two independent estimations, and then estimations are integrated in order to improve estimation performance in a model based framework. With this theoretical base, selected algorithm for implementation of slope observer is a linear Kalman filter based on vehicle longitudinal acceleration model and for mass estimation has been chosen Recursive Least Square with forgetting factor applied to equation (1).

Estimation functions have been developed to be robust to reciprocal disturbance, in practice slope disturbance hasn't influence on mass estimation by using suitably dynamic pitch-compensated longitudinal acceleration measure instead of vehicle wheels speed, while slope estimation is based on longitudinal acceleration sensor model, so, it guarantees robustness to powertrain uncertainties and mass varying by avoiding vehicle motion equation use. Otherwise mass varying disturbance is not fully rejected, there is a not erasable disturbance on longitudinal acceleration measure, static pitch acceleration offset due to vehicle mass distribution. If a vehicle running on a slope with constant speed or still on flat road is considered, there is a static offset on longitudinal acceleration sensor measure, this error is due to load distribution on vehicle, and its entity is linked to vehicle suspension stiffness. This last disturbance on slope estimation may be reduced by integrating slope and mass estimations. So, knowing vehicle load attitude diagrams and using mass estimation function is possible to recognize particular conditions of vehicle load distribution and to correct longitudinal acceleration measure in order to limit this inerasable error on slope estimation improving further estimation precision.

Figure 1:
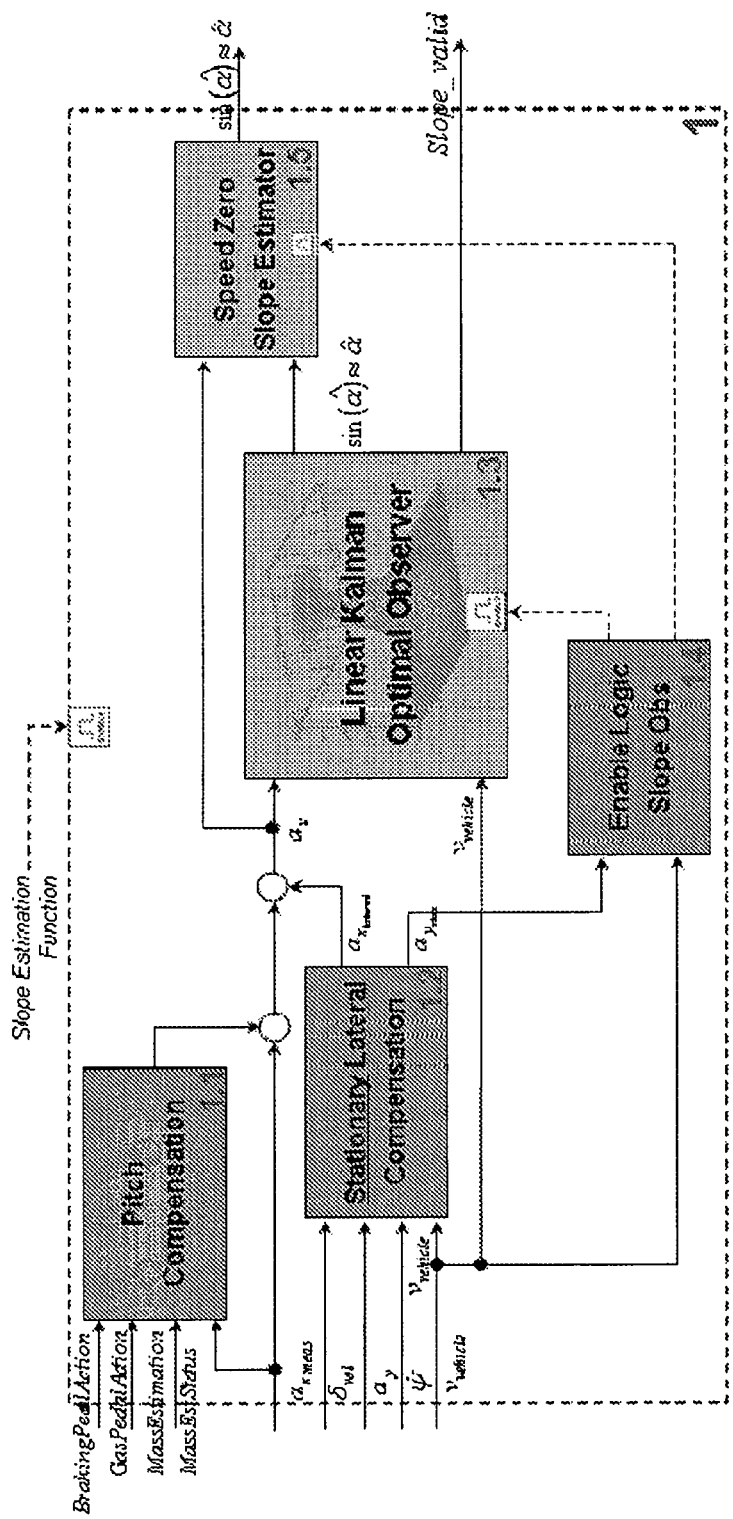
FIG. 1 depicts a block diagram representing the functional architecture of a road slope estimator according to the present invention.

FIG. 1 depicts a block diagram representing the functional architecture of a road slope estimator according to the present invention, and where all the input and output quantities based on which estimator operates are indicated.

The road slope estimator is designed to cover the greatest number of static and dynamic conditions in which the vehicle may operate, namely stationary or in motion, and, when in motion, in longitudinal motion or in a curve, with the possibility to be customized based on the application in which this information is required. In addition, the road slope estimator is model-based in order for it to be portable and tunable on different vehicles to reduce the development time and cost.

In particular, the road slope estimator comprises a Pitch Compensation Block, which corrects the longitudinal acceleration to limit the effect of pitch disturbance on the measurement of the longitudinal acceleration made by an accelerometric sensor, when the vehicle is stationary (static), is braking and is accelerating (dynamic). In essence, the accelerometric sensor measures all the main effects involved in the rigid body mechanics on an object with firm suspension when it is stationary or moving longitudinally or even when cornering. Among the different overlapping effects that are to be purged there is pitching. The pitching phenomenon is both a static and a dynamic phenomenon: in practice, the static part is related to how the vehicle settles down on the suspension based on the load distribution on the floor when the vehicle is stationary, while the dynamic part is an effect that is closely related to braking and accelerating, but extinguishes in a fast transient. The static pitch, which represents a large part of the pitching disturbance, is managed according to two different logics, wherein the first logic considers a load mass evenly distributed on the floor, and then, based on the vehicle suspension structure diagram (target), a static acceleration correction is computed, while the second logic is based, in addition to the previous correction, on information from a vehicle mass estimator.

The road slope estimator further comprises a Stationary Lateral Compensation Block, which makes a correction to limit the effect of the vehicle lateral dynamics that, in bend, introduces an additional term to the longitudinal acceleration, hence a new error to the signal. The block is based on a bike model and on target parameters of the vehicle on which the estimator is implemented.

The road slope estimator further comprises a Linear Kalman Observer designed to estimate the road slope. In order to define the Observer, it is fundamental to describe plant with a detailed model useful to quantify entity of different terms in play. In particular, longitudinal acceleration measured by sensor is expressed in canonical form in order to understand disturbances and system states for estimation.

Figure 2:
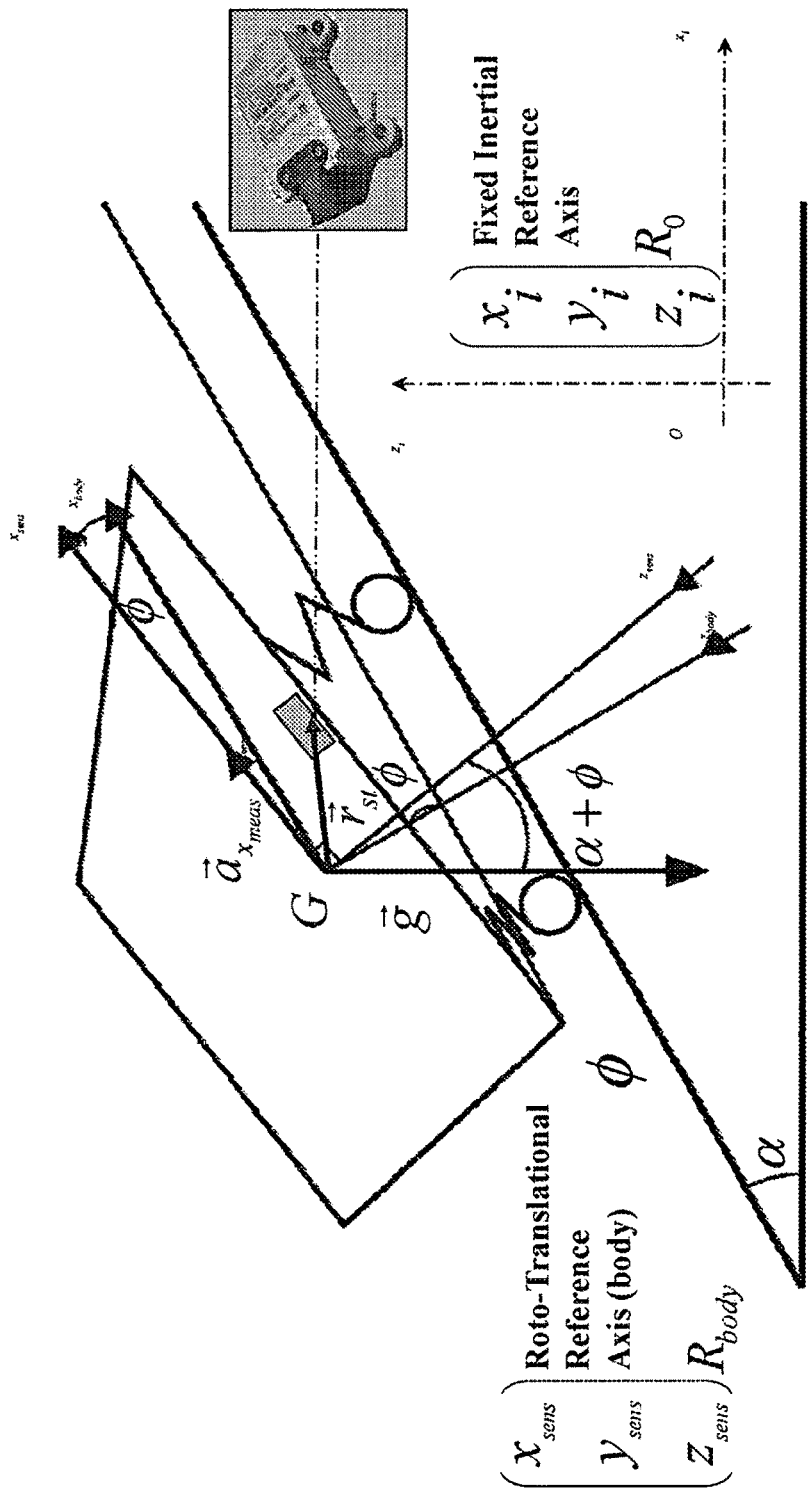
FIG. 2 depicts quantities involved in the road slope estimation carried out by a comprises a Linear Kalman Observer.

With reference to FIG. 2, according to rigid body dynamics, sensor position and direction can be described in fixed inertial reference axis always parallel to road $R_0$ as:

$$\begin{pmatrix} x_{sens} \\ y_{sens} \\ z_{sens} \end{pmatrix}^{R_0} = \vec{r}_{sens} = \vec{r}_{OG} + R^o_{body} \cdot \vec{r}_{st} \quad (2)$$

where $R_{body}$ is a reference axis fixed with vehicle which rotates on vehicle center of gravity CoG of pitch angle.

Deriving equation (2), it results in:

$$\vec{v}_{sens} = \vec{v}_{OG} + \dot{R}^o_{body} \cdot \vec{r}_{st} + R^o_{body} \cdot \dot{\vec{r}}_{st} \quad (3)$$

and again:

$$\vec{a}_{sens} = \vec{a}_{OG} + \ddot{R}^o_{body} \cdot \vec{r}_{st} + 2 \cdot \dot{R}^o_{body} \cdot \dot{\vec{r}}_{st} + R^o_{body} \cdot \ddot{\vec{r}}_{st} + \vec{g} \quad (4)$$

$$\begin{pmatrix} \ddot{x}_{sens} \\ \ddot{y}_{sens} \\ \ddot{z}_{sens} \end{pmatrix}^{R_0} = \vec{a}^{R_0}_{sens} = \vec{a}_{OG} + R^o_{body} \cdot \ddot{\vec{r}}_{st} + \dot{\omega} \times (R^o_{body} \cdot \vec{r}_{st}) + \ldots + \omega \times (\omega \times (R^o_{body} \cdot \vec{r}_{st})) + 2 \cdot \omega \times (R^o_{body} \cdot \dot{\vec{r}}_{st}) + \vec{g} \quad (5)$$

Three axis accelerations of sensor body in $R_o$ are so obtained.

Then in $R_{body}$:

$$\vec{a}_{sens}^{R_{body}} = R_o^{body} \cdot \vec{a}_{sens}^{R_o}$$

only about longitudinal axis:

$$a_{x_{sense}}^{R_{body}} = \ddot{x}_G \cdot \cos\phi - \ddot{z}_G \cdot \sin\phi + \ddot{\phi} \cdot z_{sens} + \ldots - \dot{\phi}^2 \cdot x_{sens} + g \cdot \sin\phi \quad (6)$$

Then, if the road slope angle $\alpha$ is considered:

$$a_{x_{sens}}^{R_{body}} = \ddot{x}_G \cdot \cos\phi - \ddot{z}_G \cdot \sin\phi + \ddot{\phi} \cdot z_{sens} + \ldots - \dot{\phi}^2 \cdot x_{sens} + g \cdot \sin(\phi + \alpha) \quad (7)$$

This equation is a non-linear, but time-invariant and can be approximated with a general already known linear, time-invariant relation:

$$a_{x_{Meas}} = a_x + a_{disturb} + g \cdot \sin\alpha \quad (8)$$

This equation is useful to estimate road slope independently from vehicle mass using only the longitudinal acceleration model and linear Kalman filtering theory. Term $a_{disturb}$ is the part of the vehicle's acceleration caused by disturbances not described by the model for the longitudinal dynamics. It should cover all the model errors found in this section. So, given a good description on how the state $a_{disturb}$ is changing, a Kalman filter can be used to estimate system states and to filter this disturbance.

The Kalman filter is then designed using:

$$x = [v_{vehicle} \sin \alpha]^T; u = a_{x_{meas}}; y = v_{vehicle}$$

so that:

$$\dot{v}_{vehicle} = a_x - g \cdot \sin \alpha + a_{x_{Meas}} - a_{disturb} \Rightarrow \dot{x}_1 = -g \cdot x_2 + u + v \quad (9)$$

All the process state variables are considered Gaussian stochastic ones, so the assumed noise covariance matrix has been defined in coherence with physical characteristics of stochastic variables, and then tuned in order to get the best estimation possible. In this estimation framework, term $a_{disturb}$ may be modeled as a simple process noise $v$ over slope state.

About slope state, it has been modeled according to two different approaches, the first time under the assumption that the state $x_2$ undergoes slight changes each sampling period, so its first derivative is equal to Gaussian noise:

$$\dot{x}_2 = \omega \quad (10)$$

and a second method according to a first-order Gauss-Markov process:

$$\dot{x}_2 = -\frac{1}{\tau} \cdot x_2 + \xi \quad (11)$$

where $\tau$ is a tuned parameter according to slowest slope which is to be observed.

This last approach is useful especially to filter desired slope dynamics from pitch disturbance, so give the possibility to eliminate pitch disturbance leaving only slope information, while there is the need to pre-filter longitudinal acceleration from pitch dynamics also partially. Both approaches are valid and give us interesting estimation results. The latter is preferred, so using a partially pitch corrected longitudinal acceleration as input for explained observer.

The road slope estimator further comprises an Enable Logic Block, which is designed to enable and disable road slope estimation in certain situations in which this estimate is unreliable. In fact, the road slope estimator is always active, or rather is active in as many situations of the vehicle as possible. The basic idea of the road slope estimator is to obtain an estimate as much as possible available. The only limitation is when road slope estimation when the vehicle in dynamic cornering when the lateral acceleration is above a certain threshold. In these cases, the longitudinal acceleration is too soiled by the effect of the lateral acceleration and hence it is preferred to disable the estimation and indicate this situation in a status signal that accompanies the estimate. The disabling threshold changes from vehicle to vehicle based on design specifications from the dynamic standpoint (e.g., understeer gradient and gradient balance). Estimation is disabled when the threshold is reached, and is then re-enabled when a different lower threshold is reached, so as to avoid spurious effects of activation/deactivation on the algorithms downstream of the enablement.

The road slope estimator further comprises a Speed. Zero Slope Estimator which is activated when the Linear Kalman Observer is switched off by the Enable Logic Block, during wheel speed measurements blind windows, and smoothly joins dynamic slope estimation to static slope estimation based on the only acceleration measure from inertial sensor avoiding final braking pitch and other noisy effects.

Figure 3:
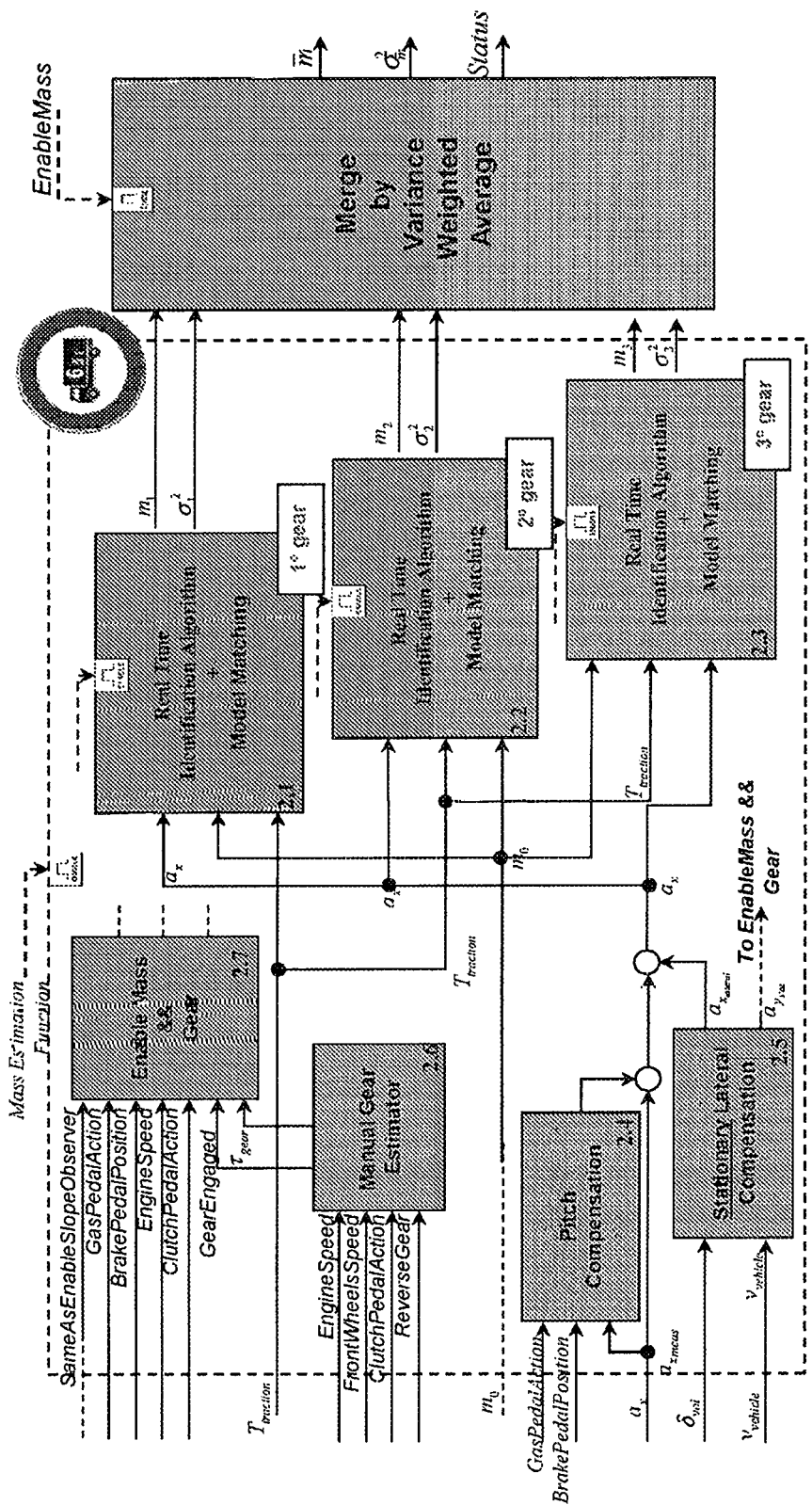
FIG. 3 depicts a block diagram representing the functional architecture of a vehicle mass estimator according to the present invention.

FIG. 3 depicts a block diagram representing the functional architecture of a vehicle mass estimator according to the present invention, and where all the input and output quantities based on which estimator operates are indicated.

The vehicle mass estimator comprises three Real Time Identification Algorithm & Model Matching Blocks associated with lower powertrain gears, one for $1^{st}$ gear, one for the $2^{nd}$ gear and one for the $3^{rd}$ gear, which are activated where longitudinal acceleration entity and powertrain "torque estimated measure" are significant.

Each one of the three blocks implements an estimation algorithm which is based on longitudinal motion in a condition that a vehicle accelerates with clutch engaged and without turning or turning with a limited lateral acceleration, with the following additional hypotheses:
  nominal known drag and rolling resistances; and
  no limitation about available surface adhesion.
Mechanical equilibrium equation at front wheels is:

$$\eta \cdot C_{traction} \cdot \tau_{diff} \cdot \tau_{gear} = \left( M \cdot R + \frac{\eta \cdot J_{mot} \cdot \tau_{diff}^2 \cdot \tau_{gear}^2}{R} + \frac{J_{wheels}}{R} \right) \cdot \ddot{x} \quad (12)$$

where $\tau_{diff}$ and $\tau_{gear}$ are respectively differential and gearbox ratio and $C_{traction}$ is traction torque, so applied motor torque at wheels minus frictions torque from powertrain estimations.

In discrete version with sampling time T:

$$\int_{(k-1)T}^{kT} C_{traction} \, dt = \ldots \quad (13)$$

$$\left( \frac{M \cdot R}{\eta \cdot \tau_{diff} \cdot \tau_{gear}} + \frac{J_{mot} \cdot \tau_{diff} \cdot \tau_{gear}}{R} + \frac{J_{wheels}}{R \cdot \eta \cdot \tau_{diff} \cdot \tau_{gear}} \right) \ldots$$

$$\left( \dot{x}(kT) - \dot{x}((k-1)T) \right)$$

Approximating the first term of equation with 'Bilinear Transformation Method':

$$\int_{(k-1)T}^{kT} C_{traction} \, dt = [(1 - \alpha) \cdot C_m((k-1)T) + \alpha \cdot C_m(kT)] \cdot T$$

with $0 \leq \alpha \leq 1$ with $\alpha = 1$ (Backward Euler Discretization):

$$C_{traction}(k) = \quad (14)$$

$$\left( \frac{M \cdot R}{\eta \cdot \tau_{diff} \cdot \tau_{gear} \cdot T} + \frac{J_{mot} \cdot \tau_{diff} \cdot \tau_{gear}}{R \cdot T} + \frac{J_{wheels}}{R \cdot \eta \cdot \tau_{diff} \cdot \tau_{gear} \cdot T} \right) \ldots$$

$$\left( \dot{x}(k) - \dot{x}((k-1)) \right)$$

In order to be robust to slope disturbance we can pass to consider in place of vehicle speed difference, measured longitudinal acceleration multiplied to sampling time:

$$C_{traction}(k) = \qquad (15)$$

$$\left(\frac{M \cdot R}{\eta \cdot \tau_{diff} \cdot \tau_{gear} \cdot T} + \frac{J_{mot} \cdot \tau_{diff} \cdot \tau_{gear}}{R \cdot T} + \frac{J_{wheels}}{R \cdot \eta \cdot \tau_{diff} \cdot \tau_{gear} \cdot T}\right) \cdots \cdot$$

$$(\ddot{x}(k) \cdot T)$$

This longitudinal equation (15) can be rewritten in following regression form:

$$y(k) = \varphi^T(k) \cdot \theta(k) + \xi(k) \qquad (16)$$

with:

$$y(k) = C_{traction}(k)$$

$$\varphi^T(k) = \ddot{x}(k) \cdot T$$

$$\theta(k) = \frac{M \cdot R}{\eta \cdot \tau_{diff} \cdot \tau_{gear} \cdot T} + \frac{J_{mot} \cdot \tau_{diff} \cdot \tau_{gear}}{R \cdot T} + \frac{J_{wheels}}{R \cdot \eta \cdot \tau_{diff} \cdot \tau_{gear} \cdot T}$$

From θ(k), vehicle mass M is:

$$M = \frac{\theta(k) \cdot \eta \cdot \tau_{diff} \cdot \tau_{gear} \cdot T}{R} - \frac{\eta \cdot J_{mot} \cdot \tau_{diff}^2 \cdot \tau_{gear}^2}{R^2} - \frac{J_{wheels}}{R^2} \qquad (17)$$

where identified θ(k) is the parameter vector and ξ(k) denotes lumped disturbance which can degrade the estimation performance of vehicle mass and which must be minimized. In order to overcome this degradation has been used RLS algorithm with forgetting factor (μ) which minimizes prediction error according to quadratic principle, and reduces RLS problem about progressive decay of algorithm reactivity with sampling aging:

$$\theta(k) = \theta(k-1) + K(k) \cdot \varepsilon(k)$$

$$K(k) = Vff(k) \cdot \varphi(k)$$

$$\varepsilon(k) = y(k) - \varphi^T(k) \cdot \varphi(k-1)$$

$$Vff(k) = (1/\mu) \cdot (Vff(k-1) - \beta_{k-1}^{-1} \cdot Vff(k-1) \cdot \varphi(k) \cdot \varphi^T(k) \cdot Vff(k-1))$$

$$\beta_{k-1} = \mu + \varphi^T(k) \cdot Vff(k-1) \cdot \varphi(k) \qquad (18)$$

Where Vff(k) is not so different from estimation variance for every sampling period and forgetting factor μ has been managed in a typical mode for estimation of constant parameters:

$$\mu(k) = \rho \cdot \mu(k-1) + (1-\rho)$$

$$\mu(0) = \mu_0 \qquad (19)$$

with $\rho \in (0; 1)$ and $\mu_0 \in (0;1)$

The vehicle mass estimator further comprises a Merge by Variance Weighted Average Block, where mixed mass estimation from different gears is obtained by using a weighted mean where performed choice about weights is:

$$\omega_i = \frac{1}{\sigma_i^2}$$

The weighted mean in this case is:

$$\overline{M} = \frac{\sum_i (M_i/\sigma_i^2)}{\sum_i (1/\sigma_i^2)}$$

and the variance of the weighted mean is:

$$\sigma^2_{\overline{M}} = \frac{1}{\sum_i \left(\frac{1}{\sigma_i^2}\right)}$$

The significance of formulation "Merge by Variance Weighted Average" is that this weighted mean is the maximum likelihood estimator of the mean of the probability distributions under the assumption that they are independent and normally distributed with the same mean.

The vehicle mass estimator further comprises a pitch compensation block, which performs the same compensation as that performed by the pitch compensation block of the road slope estimator. In practice, the same corrections as those performed to the input signals in the road slope estimation are replicated. The only difference is the lack of additional correction due to the mass estimation. In this block, in fact, in the absence of knowledge of the vehicle mass, a uniform distribution of the vehicle mass of the entire vehicle floor is assumed, thus admitting an indelible downstream computation error due to vehicle balance. Is to be noted that in this case this effect is acceptable because it is completely hidden inside of the error committed by using the engine torque signal (signal not measured but in turn estimated by the engine control-unit).

The vehicle mass estimator further comprises a stationary lateral compensation block, which makes a correction to limit the effect of the vehicle lateral dynamics, which in bend introduces an additional term to the longitudinal acceleration, hence a new error to the signal. The block is based on a bike model and on target parameters of the vehicle on which the estimator is implemented.

The vehicle mass estimator further comprises a manual gear estimator block, which, in the absence of an automatic transmission, estimates the gear selected by the driver and indicates when engagement of the powertrain system is successfully completed. In practice, based on vehicle speed, engine speed, clutch pedal position, etc., it recognizes synchronization of a gear shift to enable recursive identification algorithms in the right time, i.e., when the real system is as similar as possible to the mathematical model implemented in the real-time identification Algorithm & model matching blocks.

In the end, the vehicle mass estimator further comprises an enable mass & gear block, which manages activation of three different estimators (one for a corresponding gear) and enable them only when the real system is more likely modellable in accordance with the equations set. It is carried out in first, second and third gear, where vehicle acceleration and engine torque gradients occur such as to better highlight the differences of mass loaded on the vehicle. Activations are based on calibratable thresholds in turn based on various signals coming mainly from the powertrain and on internal estimates and are intended to minimize uncertainties deriving mainly from powertrain signals that are partly estimated (engine torque/fiction) and partly measured (engine speed, accelerator pedal, etc. . . . ).

The invention claimed is:
1. An automotive electronic control system comprising:
an accelerometer;
a sensor associated with the accelerometer for providing a vehicle acceleration signal;
a vehicle speed sensor for providing a vehicle speed signal;
a plurality of vehicle propulsion and torque sensors for providing vehicle propulsive/resistive torque signals;
a stationary lateral compensation means which makes a correction to limit vehicle lateral dynamics that, in curves, introduces an additional term to the vehicle acceleration signal wherein said lateral compensation means is based on a bike model and on target parameters of the vehicle;
a forgetting factor means which minimizes prediction error according to quadratic principles and reduces recursive least squares problems regarding progressive decay of algorithm reactivity with sampling aging;
an electronic control unit configured to receive the vehicle acceleration signal, the vehicle speed signal, and the vehicle propulsive/resistive torque signals for generating a command for vehicular control based in part on the vehicle mass, wherein the vehicle mass is estimated in real time:
when the vehicle is in motion,
compensating for accelerometric disturbances due to:
the vehicle dynamic pitch;
accelerometric components due to the vehicle lateral dynamics; and
based on a recursive least square algorithm with the forgetting factor inputted with a compensated acceleration signal for the vehicle, and
at different low gears, to estimate the vehicle mass and associated variance for each gear, and
based on the vehicle mass estimations and corresponding variances for each gear,
minimizing uncertainties on propulsive/resistive torque due to gear efficiency and rolling resistance; and
a vehicle control means for providing automated control of the vehicle based on the control command from the electronic control unit.

2. The automotive electronic control system according to claim 1, further programmed to real-time estimate road slope:
when the vehicle is considered stopped:
based on the vehicle acceleration signal,
wherein the vehicle is considered stopped in the presence of substantially zero values of the vehicle speed signal;
when the vehicle is in rectilinear and curvilinear motion:
compensating for accelerometric disturbances due to:
the vehicle static pitch resulting from the vehicle load distribution, and
the vehicle dynamic pitch due to acceleration to which the vehicle is subjected during motion, and
accelerometric disturbance components due to the vehicle lateral dynamics;
implementing a road slope observer based on a linear Kalman filter inputted with the vehicle speed signal and the compensated acceleration signal for the vehicle.

3. The automotive electronic control system according to claim 2, further programmed to:
link road slope estimation carried out when the vehicle is considered stopped and in motion:
starting road slope estimation when the vehicle is stopped based on the latest road slope estimations when the vehicle was in motion, and
starting road slope estimation when the vehicle is in motion based on the latest road slope estimations when the vehicle was stopped.

4. The automotive electronic control system according to claim 2, further programmed to either:
estimate road slope and the vehicle mass independently, or
estimate road slope based on the vehicle mass estimation.

5. The automotive electronic control system according to claim 2, further programmed to estimate road slope:
when the vehicle is in curvilinear motion:
for the vehicle lateral acceleration values comprised in a predetermined range, using the road slope observer,
having compensated accelerometric disturbances due to the vehicle lateral acceleration.

6. The automotive electronic control system according to claim 2, further programmed to compensate for accelerometric disturbances due to the vehicle static and dynamic pitches:
estimating the vehicle static pitch resulting from the vehicle load distribution based on estimated vehicle mass and attitudes diagram, and
estimating the vehicle dynamic pitch based on the vehicle acceleration signal during motion.

7. The automotive electronic control system according to claim 1, further programmed to estimate the vehicle mass:
limiting dynamic pitch effects and accelerometric disturbances effects due to the vehicle lateral acceleration on the vehicle mass estimation.

8. The automotive electronic control system according to claim 1, wherein the vehicle mass estimation is carried out as a weighted average of individual mass estimations at different gear engaged, and wherein the estimated vehicle mass is associated an overall variance computed as an average of individual variances associated with individual mass estimations.

9. The automotive electronic control system according to claim 1, wherein the vehicle mass is estimated when the vehicle is in motion and only when propulsive/resistive torque is considered reliable, and wherein the vehicle mass estimation is considered to be reliable when overall variance of estimated mass for the vehicle is lower than a threshold value.

10. The automotive electronic control system according to claim 1, wherein the vehicle mass is estimated when the vehicle is in motion and is considered to be reliable even when the vehicle successively stops.

11. The automotive electronic control system according to claim 1, wherein the vehicle mass is estimated every time that predetermined events occur that make unreliable the previous mass estimation for the vehicle.

12. A vehicle comprising an automotive electronic control unit (ECU) according to claim 1.

13. Computer software loadable into an automotive electronic control unit and designed to cause, when executed, the automotive electronic control unit to become programmed as claimed in claim 1.

14. A method for automatically estimating vehicular mass in real time for a vehicle in motion for vehicular control, comprising:

obtaining a vehicle acceleration signal from an accelerometer;

obtaining a vehicle speed signal and signals representing vehicle propulsive force from the vehicle speed sensors and from the vehicle propulsion and torque sensors;

adjusting, the vehicle acceleration signal when the vehicle is in motion for accelerometric disturbances due to the vehicle dynamic pitch and for accelerometric components due to the vehicle lateral dynamics wherein the lateral dynamics are introduced in an estimator compensation block using bike model and on-target parameters;

inputting the adjusted vehicle acceleration signal for the vehicle to a recursive least square function with a forgetting factor tied to the compensated acceleration signal wherein the forgetting factor minimizes prediction error according to quadratic principles, and reduces recursive least squares problems regarding progressive decay of algorithm reactivity with sampling aging, and generating automatically in real time the vehicle mass signals corresponding to variances for each gear based on a the vehicle mass estimated for each gear while minimizing uncertainties on the propulsive/resistive torque signals due to gear efficiency and rolling resistance; and automatically controlling the vehicle based on the real time vehicle mass signals.

* * * * *